United States Patent

Correale, Jr. et al.

(10) Patent No.: US 7,475,192 B2
(45) Date of Patent: Jan. 6, 2009

(54) CACHE ORGANIZATION FOR POWER OPTIMIZED MEMORY ACCESS

(75) Inventors: Anthony Correale, Jr., Raleigh, NC (US); Robert Lewis Goldiez, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 11/180,333

(22) Filed: Jul. 12, 2005

(65) Prior Publication Data

US 2007/0016729 A1 Jan. 18, 2007

(51) Int. Cl.
*G06F 12/06* (2006.01)
(52) U.S. Cl. ...................................... 711/127; 711/128
(58) Field of Classification Search .................... None
See application file for complete search history.

(56) References Cited

U.S. PATENT DOCUMENTS

| | | | |
|---|---|---|---|
| 5,548,742 A * | 8/1996 | Wang et al. | 711/128 |
| 5,694,567 A * | 12/1997 | Bourekas et al. | 711/3 |
| 5,715,426 A | 2/1998 | Takahashi et al. | |
| 5,870,616 A * | 2/1999 | Loper et al. | 713/324 |
| 5,913,223 A | 6/1999 | Sheppard et al. | |
| 6,094,711 A | 7/2000 | Wong | |
| 6,108,745 A | 8/2000 | Gupta et al. | |
| 6,553,478 B1 | 4/2003 | Grossier | |
| 6,608,793 B2 | 8/2003 | Park et al. | |
| 2002/0188805 A1 | 12/2002 | Kottapalli | |
| 2003/0233520 A1 | 12/2003 | Clark et al. | |

FOREIGN PATENT DOCUMENTS

JP       2000-315384       11/2000

* cited by examiner

*Primary Examiner*—Than Nguyen
(74) *Attorney, Agent, or Firm*—Sawyer Law Group LLP

(57) ABSTRACT

An N-set associative cache organization is disclosed. The cache organization comprises a plurality of SRAMs, wherein the data within the SRAMs such that a first 1/N of a plurality of cache lines is within a first portion of the plurality of SRAMs and last 1/N portion of the plurality of cache lines is within a last portion plurality of SRAMs. By using this method for organizing the caches, power can be reduced. Given an N-way set associative cache, in this method provides up to 1/N power reduction in the data portions of the SRAMs.

19 Claims, 7 Drawing Sheets

CACHE ORGANIZATION FOR POWER OPTIMIZED MEMORY ACCESS

FIELD OF THE INVENTION

The present invention relates to instruction and data caches used in micro processor based computing systems for temporarily storing instructions and data. Specifically, a system and method are described which can address the associative cache in a high performance mode.

RELATED APPLICATIONS

This application is related to the following copending application:

Application Ser. No. 10/714,105 entitled "Method and System for Providing Cache Set Selection Which is Power Optimized," filed on Nov. 14, 2003.

BACKGROUND OF THE INVENTION

Computing systems, including micro-processor based systems, use a cache in conjunction with a main memory to hold data and/or instructions which are being processed. The cache comprises a memory where the temporary contents needed for processing are maintained so that the most recently used data from a main memory is located in a cache memory for rapid access by the micro-processor system.

Cache memories are organized as set associative comprising sets of individual SRAMS which contain the desired data and which typically have common address lines. Each SRAM is referred to as a way, and in a two-way associative cache, common address lines are connected to each SRAM. Lines of multi-byte data are stored in each location of the ways. The information contained within a line of the set associative cache memory is derived by an effective address 20 generated by the microprocessor system. The effective address includes a tag field, a line index field and a byte field. The tag field of an effective address is utilized to determine whether or not one or the other ways contains the data being sought.

Both ways may be simultaneously addressed, and data from one or the other of the ways may be selected by a multiplexer by comparing a tag derived from the address applied to the ways of the associative cache to a tag contained in a tag memory or directory. The tag memory includes a row of tag data corresponding to the same row number of data in a given way. Thus, a comparison between the contents of a row of a tag memory and a tag from the tag memory determines which way contains the desired data and a multiplexer selects the desired data from the identified way.

In small computing systems, power efficiency becomes more important than was previously the case in earlier applications of set associative cache memories. Associative cache memories provide for higher speed data access when both ways are simultaneously addressed and clocked, and a late select command to the multiplexer selects the data from one of the ways. While this provides for optimum access speed, power is dissipated in each of the SRAMs of the associative cache when only one SRAM contains the selected data. This represents a significant waste of operational power, particularly in battery operated devices such as cellular telephones which may use such microprocessor systems.

To avoid the needless consumption of power by the way which does not contain the desired data, some set associative cache memories have been provided with prediction logic. These systems all provide for a prediction of which way contains the requested data, and enable only the predicted way to produce the data. However, the prediction logic consumes power, and does not guarantee 100% predictability. Accordingly, more cache misses occur on a false prediction with only a marginal savings in power consumption.

In order to reduce power consumption, some designs reduce voltage levels or the operating frequency of the access cycle. There are limitations, however, to these techniques particularly lowering the operating frequency, since providing adequate time to make a set decision, and then obtain the required data, mandates a reduced maximum frequency of operation.

In a paper entitled, "A 600 MHz Single Chip Multiprocessor With 4.8 GB/s Internal Shared Pipelined Bus and 512 kB Internal Memory", 2003 International Solid-State Circuits Conference, pg. 254 , a set associative instruction cache is described having reduced power consumption for normal prefetch cycles. Tag memory access and data memory access are divided into two consecutive cycles and only one way is activated. On the other hand during branch conditions, tag memory access and data memory access of both ways are executed in the same cycle to enhance the performance. In this way, there are two variations of cache performance, one emphasizing low power and the other high performance. However, the trade off between power savings and obtaining higher access speed is limited to normal prefetch and branch conditions. Further, the access during normal prefetch operations is made over two cycles which significantly slows down the access process. Accordingly, it would be desirable to have a system which provides high performance, as well as lower power consumption, in a variety of applications. The present invention addresses such a need.

SUMMARY OF THE INVENTION

An N-set associative cache organization is disclosed. The cache organization comprises a plurality of SRAMs, wherein the data within the SRAMs such that a first 1/N of a plurality of cache lines is within a first portion of the plurality of SRAMs and last 1/N portion of the plurality of cache lines is within a last portion plurality of SRAMs. By using this method for organizing the caches, power can be reduced. Given an N-way set associative cache, in this method provides up to 1/N power reduction in the data portions of the SRAMs.

DETAILED DESCRIPTION

The present invention relates to instruction and data caches used in microprocessor based computing systems for temporarily storing instructions and data. Specifically, a system and method are described which can address the associative cache in a high performance mode. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

SRAMs organized as cache memory are integrated in nearly all processor implementations. They also consume appreciable power. Set associativity can add to the power inefficiency as more SRAMs are employed since each set is generally associated with a given SRAM. In order to access the correct set, a number of approaches have been employed such as, late set select and set prediction. These approaches generally trade off power for performance. For example, an approach was disclosed in U.S. patent application Serial No. (RPS8-2002-0524), entitled "Method and System for Providing Cache Set Selection which is Power Optimized " and assigned to the assignee of the present application, wherein a late set select approach has a means to morph the set selection to be an early set select at reduced frequencies.

Although this system operates effectively for its stated purpose it has the deficiency of not optimizing the performance of the cache set under certain circumstances. To describe this issue in more detail refer now to the following discussion in conjunction with the accompanying Figures.

In any cache set design, architectural decisions provide the best power/performance trade-offs. One such area lies in cache associativity. Often a cache, such as a data cache, is organized as set associative. For example in a two way set associative cache there are two distinct SRAM macros, one for each set.

Figure 1:
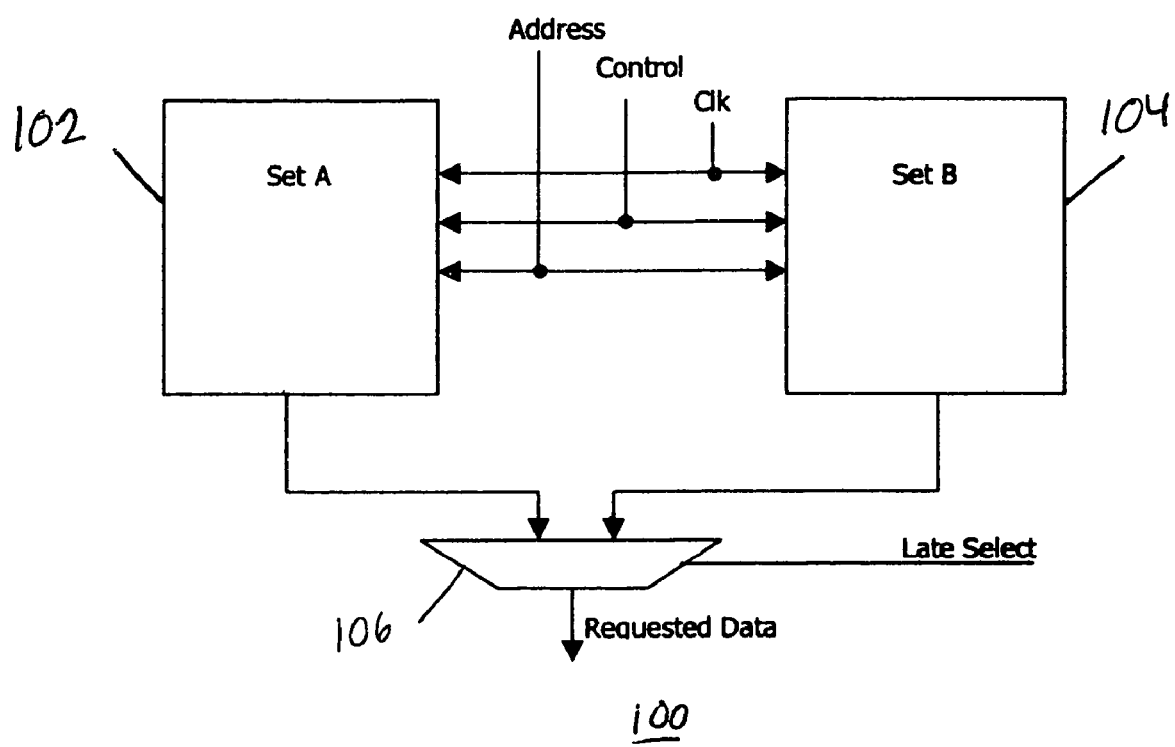
FIG. 1 illustrates a two-way set associative cache with a late select mechanism.

FIG. 1 illustrates a two-way set associative cache 100 with a late select mechanism. The cache 100 comprises a SRAM 102 and a SRAM 104 which provide data outputs to multiplexor 106. The cache 100 is accessed by an effective address. Clock pulses and control signals are applied to the SRAMs 102 and 104 to provide the data out of the appropriate SRAM. To ensure the best performance, the decision as to which SRAM contains the desired data is usually determined late in the clock cycle. This allows the control logic adequate time to make a decision as to which SRAM includes the desired data. Since the decision is one of the last to be made within a clock cycle, each SRAM 102 and 104 must be accessed earlier and then the SRAM 102 or 104 which has been chosen will be selected. Accordingly, the other SRAM access results are wasted. Therefore power inefficiency and needless noise from this type of cache 100 results under certain circumstances. As can be readily understood higher order set associative caches will yield greater power losses per cache access.

Figure 2:
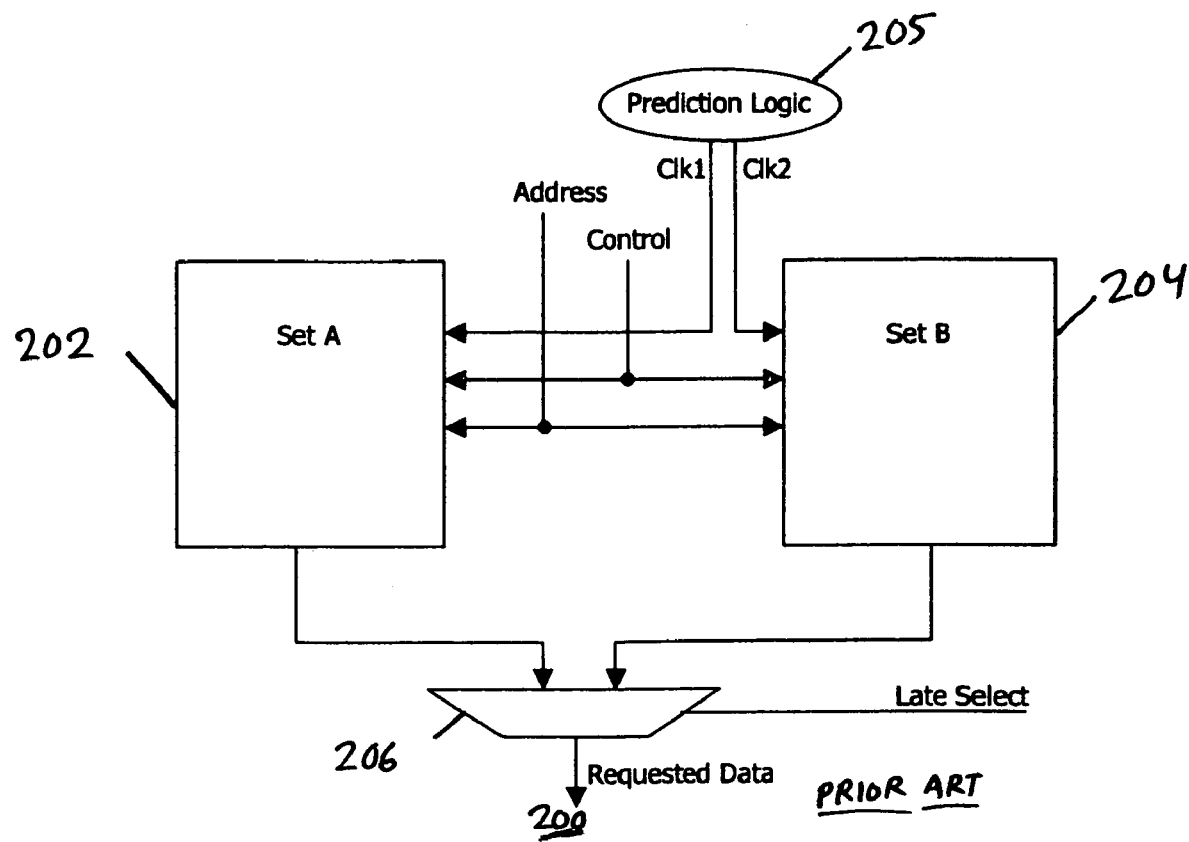
FIG. 2 illustrates a two way associative cache using two distinct SRAMs and probabilistic prediction logic.

To address this inefficiency, designers have adopted some algorithms for set prediction. FIG. 2 illustrates a two way associative cache 200 using two distinct SRAMs 202 and 204 and probabilistic prediction logic 205. This type of cache 200 operates effectively in some environments, but the prediction logic 205 consumes power and 100 percent correct predictability is not guaranteed.

Not all designs lend themselves to set prediction and are therefore relegated to the late set select mechanism of FIG. 1. For designs wherein power efficiency is important, the set prediction method should be superior to the multiple accesses approach, but in either case, for designs that are expected to operate over very broad frequency ranges and voltage/temperature conditions another approach should be addressed—the logical organization approach.

Figure 3:
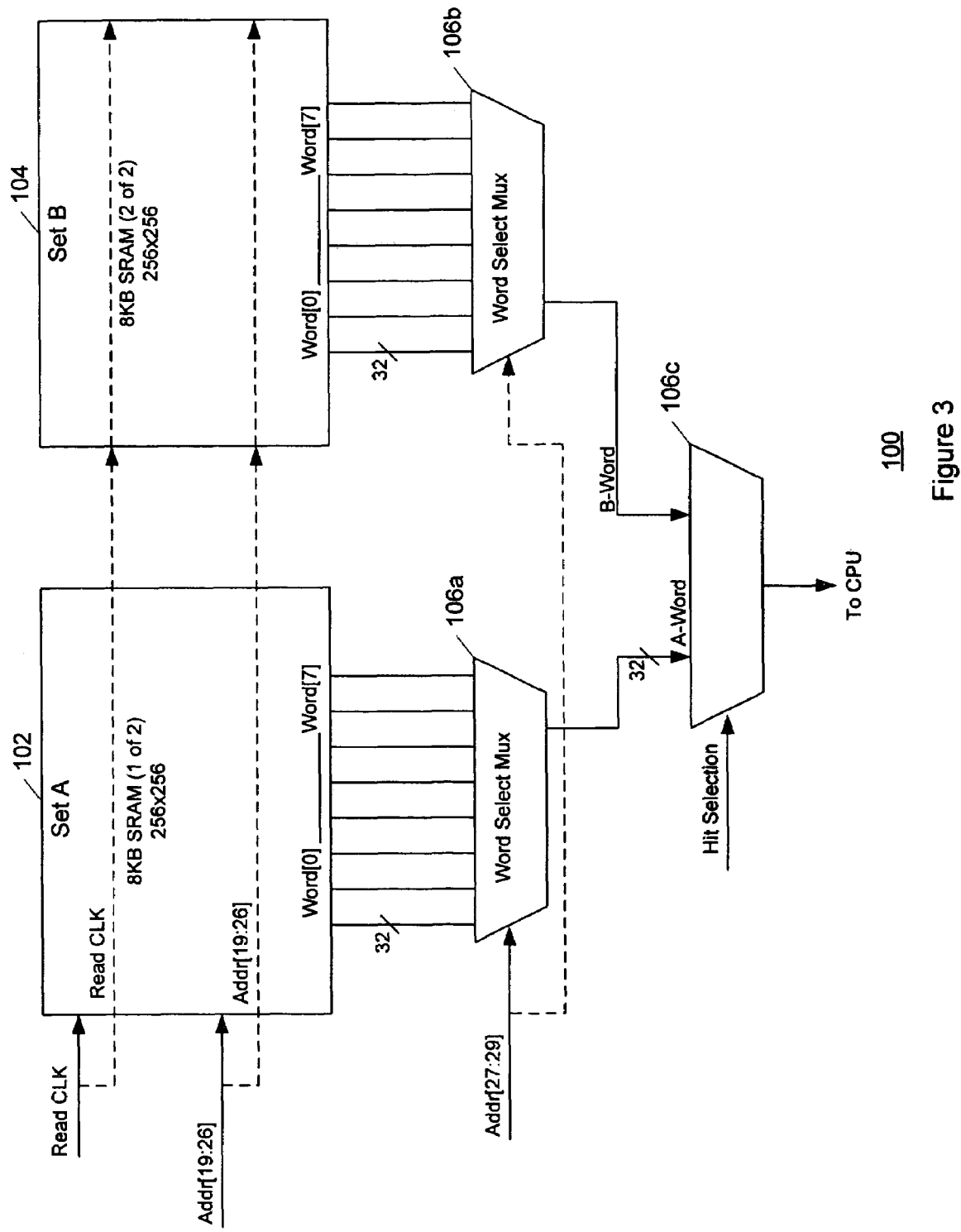
FIG. 3 illustrates a more detailed view of the cache organization of FIG. 1.

FIG. 3 illustrates a more detailed view of the cache organization 100 of FIG. 1. Consider a 256-bit cache line in a 16 KB, 2-way set associative cache. A processor with this configuration would typically have two 8 KB SRAMs 102 and 104, one for each cache way. SRAM 102 includes the A word. SRAM 104 includes the B word. The A word and B word outputs are provided to multiplexers 106a and 106b respectively via the clock signal and the addresses 19:26. In this embodiment, both SRAMs 102 and 104 must be accessed. Now, when there is a late select, "Hit Selection", via multiplexer 106c only one of the SRAMs will really deliver data to the CPU even though both were accessed at the time.

On a 32-bit processor, data is returned to the CPU in 32-bit chunks (or smaller). But, cache lines are typically larger blocks of data and stored in the SRAMs as such. When data is requested by the CPU, the data cache must search both cache ways for the data. With a late select approach, both SRAMs are accessed simultaneously. During the access parallel calculations are performed in the logic to determine if (and which) cache way contains the requested data. If the data is not found in the cache, both SRAMs were needlessly accessed, resulting in wasted power. Even if data is found, one SRAM access was needlessly accessed. More than half of the power of modem microprocessors cores is spent in accessing the caches. Accordingly, it is desirable to minimize the number of accesses to the cache.

Figure 4:
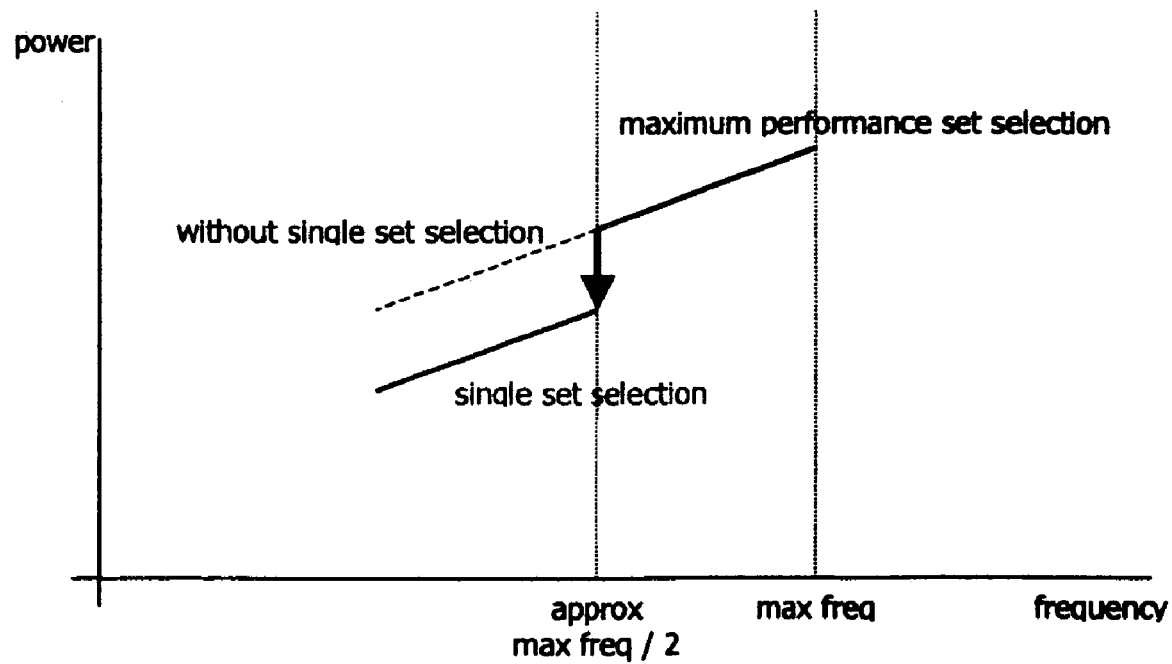
FIG. 4 is a graph which illustrates power vs. frequency during "single set selection" and without single set selection.

FIG. 4 is a graph which illustrates power vs. frequency during "single set selection" and without single set selection. The access mode may be controlled by system parameters, such as operating frequency, so that the determination can be made when the high power efficiency mode may be entered, or when the higher speed access mode is necessary for acquiring data. As can be seen from FIG. 4, during the power efficiency access mode, which is selected to occur when the frequency of data access is generally below a maximum frequency/2, significant power consumption efficiencies are obtained. Using the high speed access mode, where a late select is used to select one of the two way set associative cache memories, approximately 50% of the total power consumed is used in accessing the pair of ways. Accordingly, switching to the power efficiency mode lowers the total micro-processing system power consumption by 25%.

A limitation of the above-identified cache organization 100 is that there is a discontinuity in the power dissipation versus frequency curve for single set selection. This results in the optimal power/performance only at the lower frequencies and favors performance rather than power at the higher frequencies. What is desired is a continuous response wherein the maximum performance set selection point is the same.

By reorganizing the data in the SRAMs, only the one SRAM will need to be accessed on a CPU load instruction. By definition, the desired address is known early in the access cycle to be able to perform the lookup in the tag array. Since the address is known early, the data in the SRAMs can be organized so that this early information can be utilized.

By defining the logical organization of the SRAMs in this manner, equal power savings at all frequencies is achieved. For example, as above described a typical two-way set associative cache is organized in two SRAMs. The two SRAM configuration in accordance with the present invention would have either cache way partitioned to a particular SRAM or have the two ways interleaved across both SRAMs to relieve wiring congestion.

Utilizing this approach to data organization in the SRAMs about half of the power of the caches can be saved. For a two way set associative cache, this will result in almost 50% of the power. For an N way set associative cache, the power savings will be even more substantial.

Therefore, a system and method in accordance with the present invention interleaves the data in a specific manner without loss of performance. As is well known that the address requested is, by definition, known by the time the SRAMs are accessed. By interleaving the data in the SRAMs in a way such that words in the first half of both cache lines is in one SRAM and words in the second half of the both caches lines are in the other SRAM, additional power savings can be realized. In this organization, address bits that are typically used to multiplex the cache line down to the requested word can now be used to enable the SRAM that is required to retrieve the desired word. This interleaving method and system can be applied to any number cache way.

As before mentioned, by definition, the desired address is known early in the access cycle. Since the address is known early, the data in the SRAMs can be organized so that this early information can be utilized.

To describe the features of the present invention in more detail refer now to the following description in conjunction with accompanying Figures.

Figure 5:
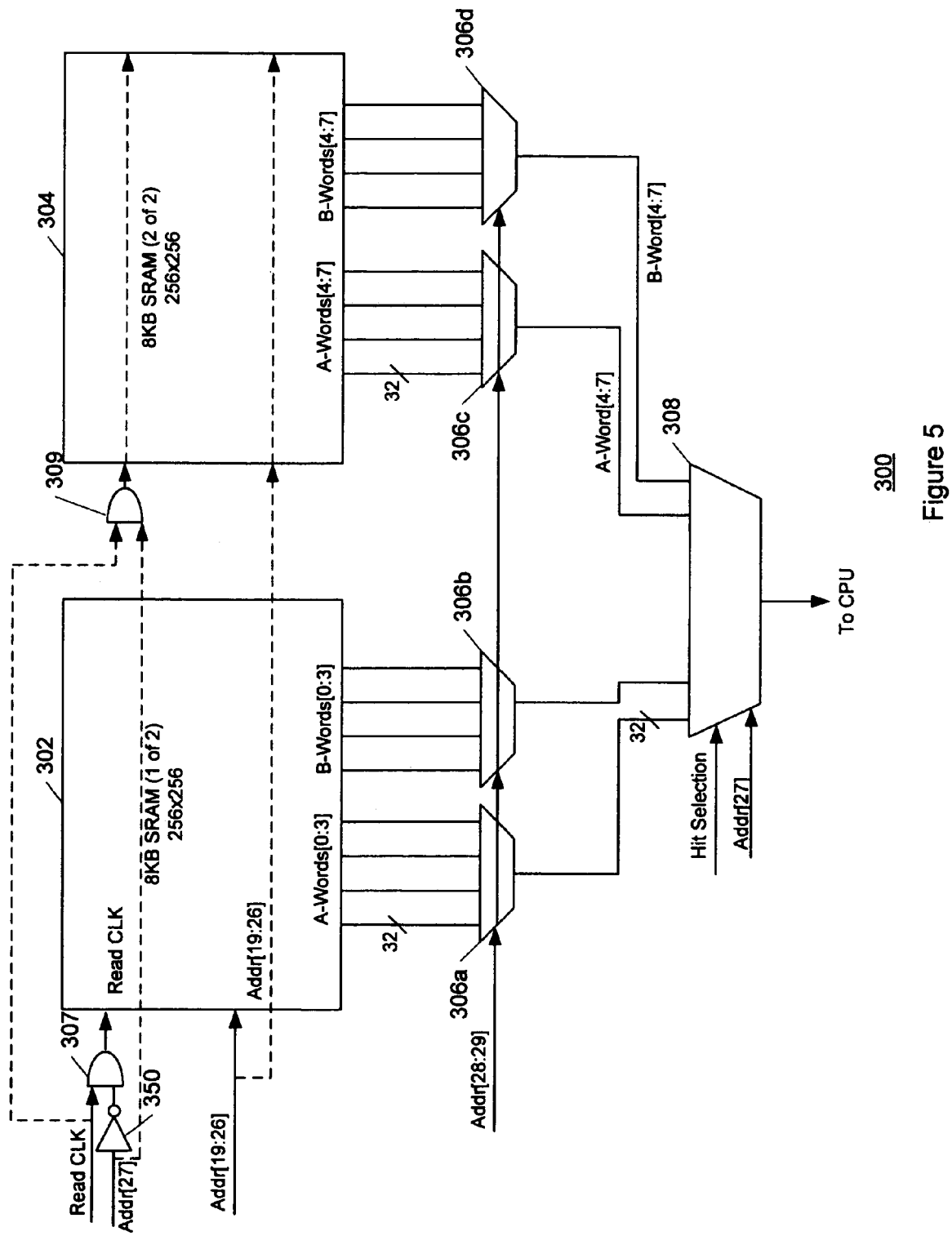
FIG. 5 illustrates a cache organization in accordance with the present invention for a 2-way set organization.

FIG. 5 illustrates a cache organization 300 in accordance with the present invention. The cache organization 300 includes a first SRAM 302 and a second SRAM 304. The desired address Addr[27] is inverted and then ANDed with the clock signal to SRAM 302 via AND gate 307 and inverter 350. The desired address Addr[27] is ANDed with the clock signal to SRAM 304 via AND gate 309. In this embodiment, specific words of both the A- and B- ways are stored in the same SRAM. In this organization 300 the first half of the A and B words (words 0-3) are stored in SRAM 302 and the second half of the A and B words (words 4-7) are stored in SRAM 304. By grouping words with the same address bit, Addr[27], only the known SRAM needs to be accessed. One of ordinary skill in the art readily recognizes that the first half of the words and second half of the words could be stored in the reverse order and they would still be within the spirit and scope of the present invention.

Accordingly, the SRAM 302 stores the upper four words of each cache way while the other SRAM 304 stores the lower four words of each cache way. When Addr[27] is logic zero, the SRAM 302 is accessed while the other SRAM 304 is not. When Addr[27] is logic one, the SRAM 304 is accessed while the other SRAM 302 is not. Even before it is known whether the desired data exists in the A- or B- way, both potential words are accessed while still only using one of the SRAMs. The multiplexing (first multiplexor set 306a and 306b, second multiplexor set 306c and 306d, and multiplexor 308) based on Addr[28,29], Addr[27] and the "hit selection" signal will correctly deliver the desired data.

Figure 6:
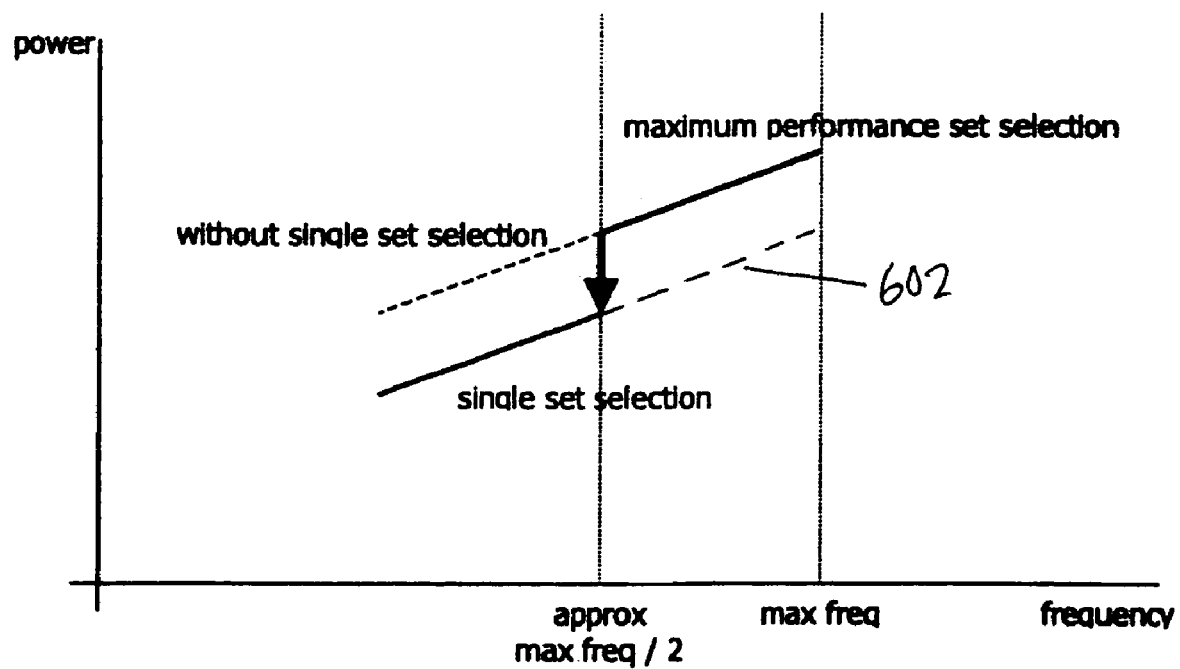
FIG. 6 is a graph which illustrates power vs. frequency during a single set selection using the cache organization of FIG. 5.

FIG. 6 is a graph which illustrates power vs. frequency during a single set selection using the cache organization of FIG. 5. As seen from this graph, using this method for organizing the caches, power can be reduced at all frequencies. As shown in FIG. 4, the cache organization 100 (FIG. 3) requires that to obtain maximum performance at maximum frequency requires significant power, since to obtain maximum performance the single set selection is disabled. Given an N-way set associative cache, where N equaled two in the previous example, this method provides up to 1/N power reduction in the data portions of the SRAMs as illustrated by dotted line 602 in FIG. 6 since the single set selection can be enabled at maximum performance.

A broader example of the present invention is a four way set selection cache. In this configuration, data is typically organized by way in separate SRAMS. To apply the present invention to this configuration, the data for each cache line would be split into four pieces. Each of the four cache sets would organize their cache lines across the four SRAMS. In this configuration, two address bits, Addr[27] and Addr[28] would be used to select the SRAM to be accessed. This would result in a 75% cache power savings since only one of four SRAMS would need to be accessed. The present invention could be scaled to N ways such that a cache line is split across N SRAMS resulting in (N−1)/N power savings.

Figure 7:
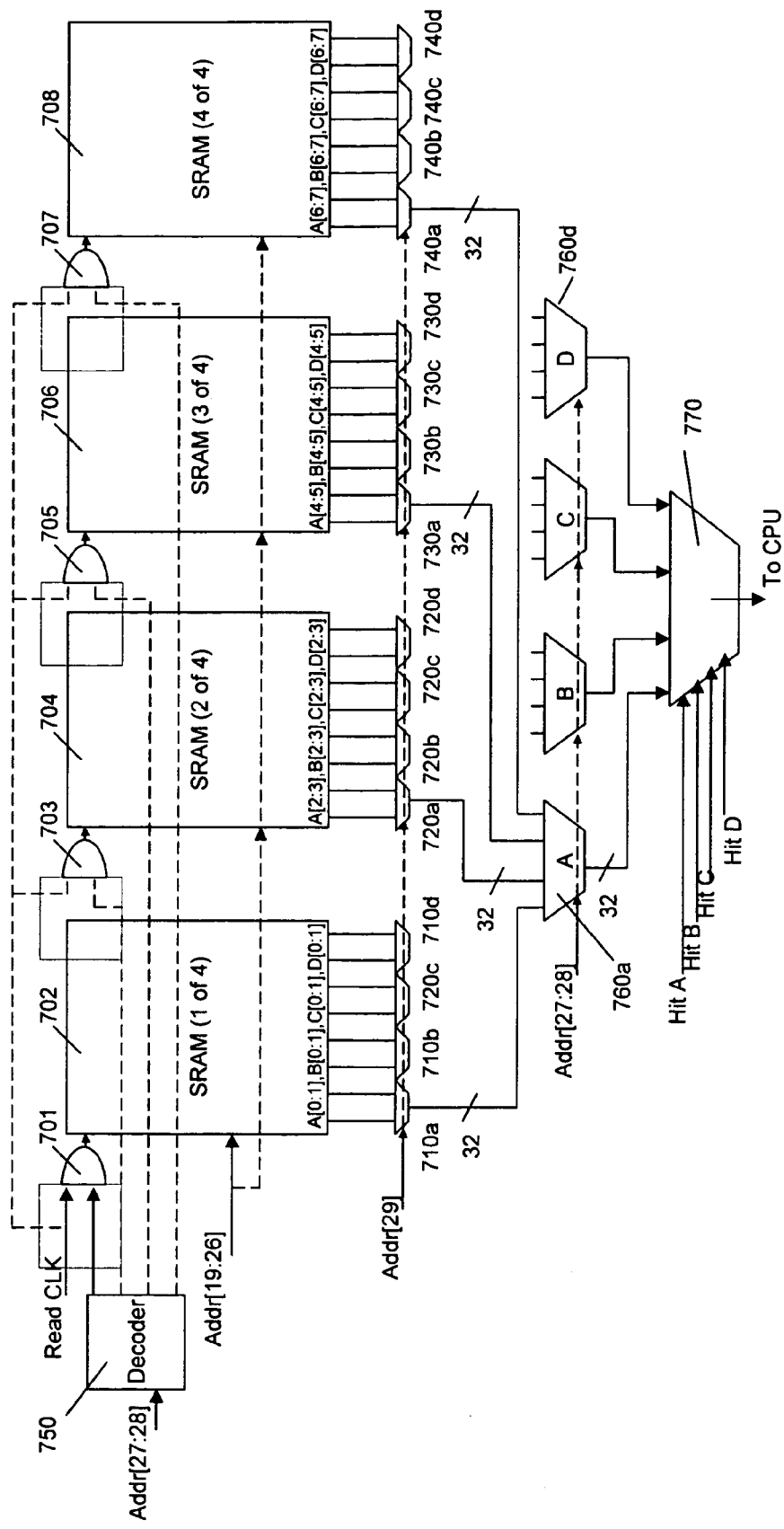
FIG. 7 illustrates a cache organization in accordance with the present invention for a 4-way set organization.

FIG. 7 illustrates a cache organization 700 in accordance with the present invention. The cache organization 700 includes a four SRAMs; SRAM 702, SRAM 704, SRAM 706, and SRAM 708. The desired addresses Addr[27] and Addr[28] are decoded in a 2-to-4 decoder 750 with each of the resulting unique decoded outputs ANDed with the clock signal to SRAM 702 via AND gate 701, to SRAM 704 via AND gate 703, to SRAM 706 via AND gate 705, and to SRAM 708 via AND gate 707. In this embodiment, specific words of the A-, B-, C-, and D-ways are stored in the same SRAM. In this organization 700 the first quarter or 1/N ways of the A-, B-, C-, and D-words (words 0-1) are stored in SRAM 702, the second quarter or 1/N ways of the A-, B-, C-, and D-words (words 2-3) are stored in SRAM 704, the third quarter or 1/N ways of the A-, B-, C-, and D-words (words 4-5) are stored in SRAM 706, and finally the fourth quarter or 1/N ways of the A-, B-, C-, and D-words (words 6-7) are stored in SRAM 708. By grouping words with the same address bits, Addr[27] and Addr[28], only the known SRAM needs to be accessed. One of ordinary skill in the art readily recognizes that the first 1/N of the words and second, third and fourth 1/N of the words could be stored in any order and they would still be within the spirit and scope of the present invention.

Accordingly, the SRAM 702 stores the upper two words of each cache way while the SRAM 704 stores the next two words of each way, SRAM 706 stores the next two words of each way and finally SRAM 708 stores the lower two words of each cache way. When Addr[27,28] are both logic zero, the SRAM 702 is accessed while the other SRAMs 704, 706 and 708 are not. When Addr[27,28] are logic zero and logic one respectively, the SRAM 704 is accessed while the other SRAMs 702, 706 and 708 are not. When Addr[27,28] are logic one and logic zero respectively, the SRAM 706 is accessed while the other SRAMs 702, 704 and 708 are not. When Addr[27,28] are both logic one, the SRAM 708 is accessed while the other SRAMs 702, 704 and 706 are not. Even before it is known whether the desired data exists in the A- or B- or C- or D-way, all potential words are accessed while still only using one of the SRAMs. The multiplexing performed by multiplexors 710a-710d, 720a-720d, 730a-730d, 740a-740d based on Addr[29], multiplexors 760a-760d based on based on Addr[27,28], and multiplexor 770 based on the "hit selection" signals Hit-A, Hit-B, Hit-C and Hit-D will correctly deliver the desired data.

Hence, the set associativity can be interleaved within a single SRAM to optimize both power and performance. This approach allows for very broad voltage and environmental application without loss of either power or performance and eliminates the need for set prediction logic. Of course, hit prediction logic could certainly be employed in this scheme. Furthermore this scheme could be utilized with higher order set associative cache sets and it would be within the spirit and scope of the present invention.

The foregoing description of the invention illustrates and describes the present invention. Additionally, the disclosure shows and describes only the preferred embodiments of the invention in the context of a power optimized cache set selection, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

Therefore, although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An N- set associative cache organization comprising:
a plurality of SRAMs, wherein the data within the plurality of SRAMs is interleaved such that a first 1/N portion of a plurality of cache lines is within a first portion of the plurality of SRAMs and last 1/N portion of the plurality of cache lines is within a last portion of the plurality of SRAMs; wherein N is an even number being equal to or greater than two.

2. The cache organization of claim 1 wherein the N- set associative cache organization comprises a two-way set associative cache organization.

3. The cache organization of claim 2 which includes a multiplexing mechanism coupled to the plurality of SRAMs delivering the appropriate data based upon a plurality of address signals and a hit selection signal.

4. The cache organization of claim 3 wherein the multiplexing mechanism comprises:
an AND mechanism for determining which of the plurality of SRAMs delivers the data based upon the address signal; and
a multiplexer mechanism for delivering the appropriate data based upon the plurality of address signals and the hit selection signal.

5. The cache organization of claim 4 wherein the AND mechanism comprises:
an inverter and AND gate coupled to one of the first and second portions of the plurality of the SRAMs; and
an AND gate coupled to the other of the first and second portions of the plurality of SRAMs, wherein each of the AND gates receives a clock signal and the first AND gate receives an inverted address signal through an inverter and the second AND gate receives a non-inverted address signal.

6. The cache organization of claim 4 wherein the multiplexer mechanism comprises:
a first multiplexer coupled to the first portion of the plurality of SRAMs;
a second multiplexer coupled to the second portion of the plurality of SRAMs; and
a third multiplexer coupled to the first and second multiplexers for delivering the desired data based on the address signal and the hit selection signal.

7. The cache organization of claim 1 wherein the N-set associative cache organization comprises a four-way set associative cache organization.

8. The cache organization of claim 7 which includes a multiplexing mechanism coupled to the plurality of SRAMs delivering the appropriate data based upon a plurality of address signals and a plurality of hit selection signals.

9. The cache organization of claim 8 wherein the multiplexing mechanism comprises:
a decoder mechanism for determining which of the plurality of SRAMs delivers the data based upon the plurality of address signals; and
a multiplexer mechanism for delivering the appropriate data based upon the plurality of address signals and the plurality of hit selection signals.

10. The cache organization of claim 9 wherein the decoder mechanism comprises:
a decoder; and
a plurality or AND gates coupled to the plurality of SRAMs and to the decoder.

11. A two-way set associative cache organization comprising:
first and second SRAMs, wherein a first half of each cache line associated with each way is placed within one of the first and second SRAMs and a second half of each cache line associated with each way is placed within the other of the first and second SRAMS.

12. The cache organization of claim 11 which includes a multiplexing mechanism coupled to the first and second SRAMs delivering the appropriate data based upon an plurality of address signals and a hit selection signal.

13. The cache organization of claim 12 wherein the multiplexing mechanism comprises:
an AND mechanism for determining which of the first and second SRAMs delivers the data based upon the address signal; and
a multiplexer mechanism for delivering the appropriate data based upon the plurality of address signals and the hit selection signal.

14. The cache organization of claim 13 wherein the AND mechanism comprises:
an AND gate coupled to one of the first and second SRAMs; and
an AND gate coupled to the other of the first and second SRAMs, wherein each of the AND gates receives a clock signal and the address signal with the first AND gate receiving an inverted address signal.

15. The cache organization of claim 13 wherein the multiplexer mechanism comprises:
a first multiplexer set coupled to the first SRAM;
a second multiplexer set coupled to the second SRAM; and
a third multiplexer coupled to the first and second multiplexer sets for delivering the desired data based on the plurality of address signals and the hit selection signal.

16. A two-way set associative cache organization comprising:
first and second SRAMs, wherein a first half of each cache line associated with each way is placed within one of the first and second SRAMs and a second half of each cache line associated with each way is placed within the other of the first and second SRAMS; and
a multiplexing mechanism coupled to the first and second SRAMs delivering the appropriate data based upon an address signal and a hit selection signal wherein the multiplexing mechanism comprises an AND mechanism for determining which of the first and second SRAMs delivers the data based upon the address signal, wherein the AND mechanism comprises an AND gate coupled to one of the first and second SRAMs; and an AND gate coupled to the other of the first and second SRAMs, wherein each of the AND gates receives a clock signal and with the first AND gate receiving an inverted address signal and the second AND gate receiving a non-inverted address signal; and a multiplexer mechanism for delivering the appropriate data based upon the address signal and the hit selection signal, wherein the multiplexer mechanism comprises a first multiplexer coupled to the first SRAM, a second multiplexer coupled to the second SRAM; and a third multiplexer coupled to the first and second multiplexers for delivering the desired data based on the address signal and the hit selection signal.

17. A four-way set associative cache organization comprising:

four SRAMs, wherein a first quarter of each cache line associated with each way is placed within a first of the four SRAMs, a second quarter of each cache line associated with each way is placed within a second of the four SRAMs, a third quarter of each cache line associated with each way is placed within a third of the four SRAMs, and a fourth quarter of each cache line associated with each way is placed within a fourth of the four SRAMs.

18. The cache organization of claim 17 which includes a multiplexing mechanism coupled to the four SRAMs delivering the appropriate data based upon a plurality of address signals and a plurality of hit selection signals.

19. The cache organization of claim 18 wherein the multiplexing mechanism comprises:

a decoder mechanism for determining which of the first, second, third and fourth SRAMs delivers the data based upon the address signals; and a multiplexer mechanism for delivering the appropriate data based upon the plurality of address signals and the plurality of hit selection signals.

\* \* \* \* \*